(12) United States Patent
Gabrielov et al.

(10) Patent No.: US 11,511,269 B2
(45) Date of Patent: Nov. 29, 2022

(54) HYDROPROCESSING CATALYST HAVING AN ORGANIC ADDITIVE WITH OVERLAID METALS AND METHOD OF MAKING AND USING SUCH CATALYST

(71) Applicant: SHELL OIL COMPANY, Houston, TX (US)

(72) Inventors: Alexei Grigorievich Gabrielov, Houston, TX (US); Kunquan Yu, Houston, TX (US)

(73) Assignee: SHELL USA, INC., Houston, TX (US)

( * ) Notice: Subject to any disclaimer, the term of this patent is extended or adjusted under 35 U.S.C. 154(b) by 20 days.

(21) Appl. No.: 17/071,677

(22) Filed: Oct. 15, 2020

(65) Prior Publication Data

US 2021/0114014 A1   Apr. 22, 2021

Related U.S. Application Data

(60) Provisional application No. 62/923,384, filed on Oct. 18, 2019.

(51) Int. Cl.

| | | |
|---|---|---|
| *B01J 37/02* | (2006.01) | |
| *B01J 31/02* | (2006.01) | |
| *C10G 45/08* | (2006.01) | |
| *B01J 21/04* | (2006.01) | |
| *B01J 23/755* | (2006.01) | |
| *B01J 23/882* | (2006.01) | |
| *B01J 23/883* | (2006.01) | |
| *B01J 35/02* | (2006.01) | |
| *B01J 35/10* | (2006.01) | |

(52) U.S. Cl.
CPC ........... *B01J 37/0209* (2013.01); *B01J 21/04* (2013.01); *B01J 23/755* (2013.01); *B01J 23/882* (2013.01); *B01J 23/883* (2013.01); *B01J 31/0209* (2013.01); *B01J 31/0237* (2013.01); *B01J 35/026* (2013.01); *B01J 35/1019* (2013.01); *B01J 35/1038* (2013.01); *B01J 35/1061* (2013.01); *B01J 37/0203* (2013.01); *B01J 37/024* (2013.01); *B01J 37/0205* (2013.01); *B01J 37/0236* (2013.01); *C10G 45/08* (2013.01); *C10G 2300/1074* (2013.01); *C10G 2300/202* (2013.01); *C10G 2300/205* (2013.01); *C10G 2300/308* (2013.01); *C10G 2300/4018* (2013.01)

(58) Field of Classification Search
CPC ............... B01J 31/0209; B01J 31/0237; B01J 31/0238; B01J 31/2213; B01J 37/0203; B01J 37/0205; B01J 37/0209; B01J 37/0236; B01J 37/024; C10G 45/08
See application file for complete search history.

(56) References Cited

U.S. PATENT DOCUMENTS

| | | |
|---|---|---|
| 6,037,300 A | 3/2000 | Kasztelan et al. |
| 8,262,905 B2 | 9/2012 | Gabrielov et al. |
| 9,156,029 B2 | 10/2015 | Gabrielov et al. |
| 9,211,536 B2 | 12/2015 | Gabrielov et al. |
| 9,376,637 B2 | 6/2016 | Gabrielov et al. |
| 2010/0236988 A1* | 9/2010 | Gabrielov .............. B01J 23/883 208/217 |
| 2012/0205291 A1* | 8/2012 | Gabrielov ............ B01J 35/1019 977/773 |
| 2013/0165316 A1* | 6/2013 | Guichard ................. B01J 23/24 208/143 |
| 2013/0270490 A1 | 10/2013 | De La Vega et al. |
| 2015/0011384 A1 | 1/2015 | Radlowski et al. |

OTHER PUBLICATIONS

International Search Report and Written Opinion Received for PCT Application No. PCT/EP2020/079127, dated Jan. 14, 2021, 14 pages.
International Search Report and Written Opinion Received for PCT Application No. PCT/EP2020/079111, dated Jan. 14, 2021, 14 pages.
International Search Report and Written Opinion Received for PCT Application No. PCT/EP2020/079121, dated Jan. 18, 2021.

\* cited by examiner

*Primary Examiner* — Renee Robinson
(74) *Attorney, Agent, or Firm* — Shell USA, Inc.

(57) ABSTRACT

A highly active hydroprocessing catalyst that comprises a doped support impregnated with at lease one hydrogenation metal component and filled with an organic additive blend. The catalyst is made by providing a doped support particle followed by impregnating the doped support particle with a metal impregnation solution to provide a metal-impregnated doped support particle. The metal-impregnated doped support particle is dried but not calcined and impregnated with an organic additive blend component.

15 Claims, No Drawings

HYDROPROCESSING CATALYST HAVING AN ORGANIC ADDITIVE WITH OVERLAID METALS AND METHOD OF MAKING AND USING SUCH CATALYST

This application claims the benefit of U.S. Provisional Application 62/923,384 filed Oct. 18, 2019, entitled HYDROPROCESSING CATALYST HAVING AN ORGANIC ADDITIVE WITH OVERLAID METALS AND METHOD OF MAKING AND USING SUCH CATALYST, the entirely of which is incorporated herein.

FIELD OF THE INVENTION

The invention relates to a hydroprocessing catalyst composition that includes a doped support overlaid with a hydrogenation metal component and impregnated with an organic additive blend of an acetate compound and an unsaturated fatty amine compound, a method of making the catalyst composition, and the use of the catalyst composition.

BACKGROUND OF THE INVENTION

Hydroprocessing catalysts are used in processes to remove organic sulfur and nitrogen compounds from hydrocarbon feedstocks that are typically derived from the distillation of crude petroleum. In these processes the organic sulfur and nitrogen compounds are catalytically converted in the presence of hydrogen respectively to hydrogen sulfide and ammonia to then subsequently be removed from the hydrotreated feedstock.

Typical hydroprocessing catalysts include a carrier having deposited thereon a Group VIB metal, such as molybdenum and tungsten, and a Group VIII metal, such as nickel and cobalt. Phosphorus may also be present in the hydroprocessing catalyst. One method of preparing a hydroprocessing catalyst includes impregnating a carrier with the hydrogenation metal components followed by calcining the impregnated carrier to convert the metal components into oxides. The calcined catalyst is then subjected to a sulfidation treatment to convert the metal oxides to metal sulfide.

Presented in the prior art are many different catalyst compositions that are useful in hydroprocessing of hydrocarbon feedstocks. For instance, U.S. Pat. No. 9,156,029 (Gabrielov et al.) discloses a hydroprocessing catalyst having a support loaded with an active metal precursor, an amine component, and a non-amine containing polar additive. The catalyst is made by incorporating a metal component into the support material to give a metal-loaded support followed by impregnation with the amine compound and non-amine containing polar additive. This impregnated composition is then treated with hydrogen and a sulfur compound and used in the hydrotreating of a hydrocarbon feedstock.

Another catalyst found to be useful in hydroprocessing of hydrocarbon feedstocks is disclosed in U.S. Pat. No. 8,262,905 (Gabrielov et al.). This catalyst is prepared by incorporating a metal component into a support material to provide the support material loaded with the metal followed by impregnation with a hydrocarbon oil and a polar additive. The impregnated composition is then treated with hydrogen and a sulfur compound and used in the hydrotreating of a hydrocarbon feedstock.

U.S. Pat. No. 9,211,536 (Gabrielov et al.) discloses a hydroprocessing catalyst having exceptional hydrodesulfurization and hydrodenitrogenation activity and good catalytic stability. This catalyst includes a shaped support formed from a mixture of inorganic oxide powder and catalyst fines. Incorporated into the shaped support that has been dried and calcined are a chelating agent, at least one catalytic metal, and a polar additive. The polar additive is impregnated into the dried chelant treated metal-incorporated support. This composition is then treated with hydrogen and a sulfur compound and used in the hydrotreating of a hydrocarbon feedstock.

U.S. Pat. No. 9,376,637 (Gabrielov et al.) discloses another exceptional hydroprocessing catalyst. This catalyst comprises a shaped support that has had a metal solution with a chelating agent incorporated into the shaped support by a single-step impregnation. Incorporated into this dried metal-incorporated support is a polar additive followed by treatment with hydrogen and sulfur to provide the catalyst composition. This activated additive impregnated composition may suitably be used in hydrotreating of distillate feedstocks.

There is an ongoing need to find new and improved hydroprocessing catalysts with enhanced catalytic properties. Industry is perpetually searching for better hydroprocessing catalyst compositions that are highly active and stable when used in the treatment of petroleum-derived hydrocarbon process streams that have high concentrations of sulfur and nitrogen.

BRIEF SUMMARY OF THE INVENTION

It, thus, is an object of this invention to provide a composition that is useful and highly active in the catalytic hydrotreating of hydrocarbon feedstocks and a method of preparing such a composition.

Accordingly, provided is a hydroprocessing catalyst, comprising a doped support particle with a metal overlayer of at least one hydrogenation metal component and impregnated with an organic additive blend. The doped support particle comprises an inorganic oxide and from 0.01 to 5 wt. % nickel or boron, or both. The organic additive blend comprises an acetate compound and an unsaturated fatty amine.

The hydroprocessing catalyst is made by providing a doped support particle, comprising a dopant and an inorganic oxide. This doped support particle is impregnated with a metal impregnation solution, comprising at least one hydrogenation metal component, to provide a metal-impregnated doped support particle. The metal-impregnated doped support particle is then dried to provide a dried particle that is impregnated with an organic additive blend, comprising an acetate compound and an unsaturated fatty amine compound.

The inventive hydroprocessing catalyst and the catalyst composition made by the inventive method can be used to treat hydrocarbon feedstocks by contacting a feedstock with the catalyst under hydroprocessing conditions to yield a treated hydrocarbon effluent.

DETAILED DESCRIPTION OF THE INVENTION

The composition of the invention is particularly useful in applications involving the catalytic hydroprocessing of petroleum derived feedstocks, such as in the hydrotreating of atmospheric distillates, gas oils and residues and of vacuum gas oils and residues.

The inventive catalyst composition comprises a doped support particle that comprises an inorganic oxide component and a relatively low concentration of either a nickel component or a boron component or a combination of both metal components. This doped support particle is further overlaid with one or more at least one metal component having a hydrogenation function. The overlaying of the metal components onto the doped support particle provide for so-called underbedding of the metal or dopant component of the doped support particle. The doped support particle that is overlaid with at least one hydrogenation metal component and dried, if needed, but not calcined, further comprises or is filled with an organic additive blend of an acetate compound and an unsaturated fatty amine compound.

This inventive composition exhibits improved hydrodesulfurization (HDS) and hydrodenitrogenation (HDN) activity over comparative catalyst compositions. The unique combination of the doped support that is overlaid with a hydrogenation metal and filled with a specific organic additive blend or mixture provides a composition that when activated has enhanced HDS and HDN catalytic characteristics.

An important and essential component of the inventive composition is the doped support particle. What is meant herein in the references to the support particle as being doped is that a particle is formed with a suitable inorganic porous refractory oxide and the particle includes an incorporated dopant. The dopant is either a nickel component or a boron component or a combination of both nickel and boron components. The concentration of the dopant in the particle that comprises predominantly an inorganic oxide component is relatively low as more fully discussed below.

Several different methods can be used to prepare the doped support particle of the inventive composition. In one method, the inorganic oxide support particle is first formed. This formed support particle may then be either dried-only or dried and calcined followed by incorporation of or impregnation with the dopant component and calcination to provide a doped support particle that is ready for overlaying with the hydrogenation metals by impregnation.

The preferred method of preparing the doped support particle, however, is by mixing or co-mulling the dopant component with the inorganic oxide and forming a support particle with the mixture. The formed support particle is then dried and calcined to provide the doped support particle that is used in preparing the catalyst of the invention.

The concentration of the underbedded dopant in the doped support particle is also an important feature of the inventive composition. The concentration should be such that it contributes to the enhanced properties of the final catalyst composition. Whether the dopant is nickel alone or boron alone or a combination of both nickel and boron, the total concentration of the dopant or dopants in the doped support particle should be in the range of from 0.01 wt. % to 5 wt. %, based on the weight of the calcined doped support particle and the dopant as an oxide ($B_2O_3$ and NiO). For better catalyst performance, however, the dopant should be present in the doped support particle in an amount in the range of from 0.1 wt. % to 4 wt. %. A preferred concentration of the dopant in the doped support particle is in the range of from 0.15 wt. % to 3 wt. %, and, most preferably, it is in the range of from 0.2 wt. % to 2 wt. %.

The boron source for the doped support particle will typically be selected from the group consisting of meta-boric acid ($HBO_2$), ortho-boric acid ($H_3BO_3$), ammonium borate tetra-hydrate [$(NH_4)_2B_4O_7.4H_2O$], sodium tetra borate, ammonium borate, ammonium tetra borate $(NH_4)_2B_4O_7$, boric oxide ($B_2O_3$), various mono-, di- and tri-alkylamine borates (e.g., triethanol amine borate), ammonium tetra phenyl borate, or the like. Suitable non-limiting examples of the boron source include ortho-boric acid ($H_3BO_3$) and ammonium tetra borate tetra-hydrate [$(NH_4)_2B_4O_7.4H_2O$] and mixtures of two or more of the foregoing.

The nickel source for the doped support particle can be a nickel salt including nickel acetates, formats, citrates, oxides, hydroxides, carbonates, nitrates, sulfates, and two or more thereof. The preferred nickel salt is a nitrate.

The inorganic porous refractory oxide used in the preparation of the doped support particle may be any material that suitably allows for incorporation of the dopant and for overlaying and supporting the metal hydrogenation components and receiving the organic additive blend of the hydroprocessing catalyst. The inorganic porous refractory oxide of the doped support particle should have porosity that allows for further filling with a metal impregnation solution and, after drying, filling with the organic additive blend of the invention.

Examples of possible suitable inorganic porous refractory oxides of the doped support particle include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the doped support of the inventive composition is one selected from the group consisting of alumina, silica, and silica-alumina. Among these, the most preferred porous refractory oxide is alumina.

The porous refractory oxide generally may have an average pore diameter in the range of from about 50 Angstroms to about 200 Angstroms. The total pore volume of the porous refractory oxide as measured by standard mercury porosimetry methods is in the range of from about 0.2 cc/gram to about 2 cc/gram.

The surface area of the porous refractory oxide, as measured by the B.E.T. method, generally exceeds about 100 $m^2$/gram, and it is typically in the range of from about 100 $m^2$/gram to about 500 $m^2$/gram, or in the range of from 125 to 400 $m^2$/gram.

In the preparation of the doped support particle it is dried under standard drying conditions that can include a drying temperature in the range of from 50° C. to 200° C., preferably, from 75° C. to 175° C., and more preferably, from 90° C. to 150° C. After drying, the doped support particle is calcined under standard calcination conditions that include a calcination temperature in the range of from 250° C. to 900° C., preferably, from 300° C. to 800° C., and, most preferably, from 350° C. to 600° C.

The doped support particle should have a surface area and pore volume that allow for its impregnation with the overlayer of metal components and organic additive blend of the invention. The doped support particle can have a surface area (determined by the BET method employing $N_2$, ASTM test method D3037) that is in the range of from 50 $m^2$/g to 450 $m^2$/g, preferably, from 75 $m^2$/g to 400 $m^2$/g, and, most preferably, from 100 $m^2$/g to 350 $m^2$/g.

The mean pore diameter in angstroms (Å) of the doped support particle is in the range of from 50 to 200, preferably, from 70 to 150, and, most preferably, from 75 to 125.

The pore volume of the doped support particle should exceed 0.55 cc/g and is typically in the range of from 0.5 cc/g to 1.1 cc/g. More typically, the pore volume is in the range of from 0.6 cc/g to 1.0 cc/g, and, most typically, it is from 0.7 to 0.9 cc/g.

The references herein to pore size distribution and pore volume of the doped support particle are properties as determined by mercury intrusion porosimetry, ASTM test method D 4284. The measurement of the pore size distribution of the doped support particle is by any suitable measurement instrument using a contact angle of 140° with a mercury surface tension of 474 dyne/cm at 25° C.

To provide the metal overlayer feature of the inventive catalyst composition, the doped support particle is impregnated with a metals impregnation solution thereby providing a metal overlayer of at least one hydrogenation metal component. This metal-impregnated, doped support particle is impregnated with amounts of the hydrogenation metal component or components to provide a metals content in the final catalyst within the required concentration ranges for having an effective catalyst.

The doped support particle is impregnated in one or more impregnation steps with at least one metal component using one or more aqueous solutions containing at least one metal salt wherein the metal compound of the metal salt solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component.

For the Group 9 and 10 metals, the metal salts used to prepare the impregnation solution include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the metal impregnation solution is selected to provide the desired metal content in the final composition of the invention taking into consideration the pore volume of the doped support particle into which the aqueous solution is impregnated. Typically, the concentration of metal compound in the impregnation solution is in the range of from 0.01 to 100 moles per liter.

The amount of overlaid metal in the metal-impregnated, doped support particle can depend upon the application for which the final composition of the invention is to be used. Generally, for hydroprocessing applications, the Group 9 and 10 metal components, i.e., cobalt or nickel, can be present as an overlayer of metal in the doped support particle to provide a metal-impregnated, doped support particle having a metal component incorporated therein in an amount in the range of from 0.5 wt. % to 20 wt. %, preferably from 1 wt. % to 15 wt. %, and, most preferably, from 2 wt. % to 12 wt. %. These weight percent values are based on the weight of the the dry metal-impregnated doped support particle, or the dry metal-overlaid doped support particle, and the metal component in the elemental form regardless of its actual form, e.g., the oxide form or sulfide form, in the composition.

The overlaid Group 6 metal component, i.e., molybdenum or tungsten, preferably, molybdenum, is incorporated into the doped support particle in an amount in the range of from 5 wt. % to 50 wt. %, preferably from 8 wt. % to 40 wt. %, and, most preferably, from 12 wt. % to 30 wt. %. These weight percent values are based on the weight of the the dry metal-impregnated doped support particle, or the dry metal-overlaid doped support particle, and the metal component in the elemental form regardless of its actual form, e.g., the oxide form or sulfide form, in the composition.

In the inventive method of preparing or making the catalyst composition of the invention, the metal impregnation solution may be an aqueous solution comprising at least one hydrogenation metal component, as described above, having a hydrogenation function. The at least one hydrogenation metal component of the metal impregnation solution may include, for example, a metal selected from the group consisting of nickel, cobalt, molybdenum, tungsten and any combination of two or more thereof, and is incorporated into the doped support particle to thereby provide a metal-impregnated doped support particle and an overlayer of the hydrogenation metal.

The incorporation of the metal impregnation solution into the doped support particle may be done by any suitable means or method known to those skilled in the art. Such method may include standard impregnation by incipient wetness or even soaking the doped support particle with an excess amount of the metal impregnation solution than would be used in a dry impregnation or an incipient wetness impregnation.

Regardless, however, of the actual means or method used to incorporate the metal impregnation solution into the doped support particle, the pores of the resulting metal-impregnated doped support particle are filled with the metal impregnation solution. As a result, the pores are not able to retain or be filled with additional volume of liquid or other material, such as the organic additive blend of the invention.

The metal-incorporated doped support particle, thus, undergoes a drying step by which at least a portion of the volatiles content is driven from the metal-impregnated doped support particle but leaving the metals behind upon the surface of the doped support particle. This provides a dried particle having available pore volume that can be filled with the organic additive blend of the invention. The dried particle is, thus, a doped support particle that has been impregnated with a metal impregnation solution that provides a metal-impregnated doped support particle. The metal-impregnated doped support particle is then dried giving the dried particle.

The metal-impregnated doped support particle is then dried under drying conditions that include a drying temperature that is less than a calcination temperature. This indeed is an important feature of the inventive method, which is to dry the metal-impregnated doped support particle at a drying temperature not exceeding a calcination temperature.

The drying temperature then should not exceed 400° C., and, preferably, the drying temperature at which the metal-impregnated doped support particle is dried does not exceed 300° C., and, most preferably, the drying temperature does not exceed 250° C. It is understood that this drying step will, in general, be conducted at lower temperatures than those mentioned above. Typically, the drying temperature will be conducted at a temperature in the range of from 60° C. to 150° C. This drying step provides a dried particle that may then be filled with the organic additive blend of the invention.

The drying of the metal-impregnated doped support particle is preferably controlled in a manner to provide the resulting dried particle that has a volatiles content within a desired range. The volatiles content of the dried particle should be controlled so that it does not exceed 20 wt. % LOI. It is preferred for the LOI of the dried particle to be in the range of from 1 wt. % to 20 wt. % LOI, and, most preferred, from 3 wt. % to 15 wt. % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

The organic additive blend component of the inventive hydroprocessing catalyst is impregnated into available pore volume of the pores of the dried particle provided by drying of the metal-impregnated doped support particle. This is done by incorporating the organic additive blend into the dried particle to provide an additive impregnated dried particle by applying any suitable method or means to impregnate the dried particle with the organic additive blend.

The preferred method of impregnating the dried particle with the organic additive blend may be any standard well-known pore fill methodology whereby the pore volume is filled by taking advantage of capillary action to draw the liquid into the pores of the dried particle. The percentage of the pore volume of the dried particle that is filled with the organic additive blend is in the range of from 25% up to 100% of the available pore volume of the dried particle. Preferably, at least 50% of the available pore volume of the dried particle is filled with the organic blend, and, more preferably, at least 70% is filled with the organic additive blend. It is preferred for up to 100% of the available pore volume of the dried particle to be filled with the organic additive blend, but the pores of the additive impregnated dried particle may have up to 95% or even up to 90% of the available pore volume filled with the organic additive blend. The filling of the dried particle with the organic additive blend provides a final composition that when activated exhibits exceptional hydroprocessing catalytic properties.

The combined features of using a doped support particle, having an overlaid hydrogenation metal, that is impregnated with an organic additive blend provide for the inventive composition having enhanced hydroprocessing activity. The organic additive blend component of the inventive catalyst comprises both an acetate compound and an unsaturated fatty amine. The organic additive blend should include its individual components at a weight ratio of the unsaturated fatty amine compound-to-acetate compound in the range of from 0.1:1 to 10:1. It is preferred for the organic additive blend to have a weight ratio of the unsaturated fatty amine-to-acetate in the range of from 0.2:1 to 8:1, and, more preferably, from 0.3:1 to 2:1. Most preferably, the weight ratio of the unsaturated fatty amine-to-acetate is in the range of from 30/70 to 15/10.

The acetate compound component of the organic additive blend used in the preparation of the inventive catalyst composition may be any suitable molecular compound having an acetate moiety and that contributes to the enhanced catalytic properties of the final catalyst composition of the invention. Such an acetate compound must be liquid under the temperature conditions of the catalyst preparation (typically within the temperature range of from 0° C. to 40° C.) and miscible with the unsaturated fatty amine component of the organic additive blend of the inventive catalyst composition.

The acetate compound of the organic additive blend may be selected from among suitable acetate compounds in the group consisting of alkyl acetates, ethoxy alkyl acetates, methoxy alkyl acetates, and alkoxy alkoxy alkyl acetates.

The alkyl acetates from which the acetate compound is selected may be represented by the formula: $CH_3C(O)OR_n$, wherein R represents an alkyl group and n=an integer of from 1 to 20 representative of the number of carbon atoms in R.

The ethoxy alkyl acetates from which the acetate compound is selected may be represented by the formula: $CH_3CH_2OR_nO(O)CCH_3$, wherein R represents the number of carbons within the range of n=an integer of from 1 to 10.

The methoxy alkyl acetates from which the acetate compound is selected may be represented by the formula: $CH_3OR_nO(O)CCH_3$, wherein R represents the number of carbons within the range of n=an integer of from 1 to 10.

The alkoxy alkoxy alkyl acetates from which the acetate compound is selected may be represented by the formula $R_1OR_2OR_3O(O)CCH_3$, wherein $R_1$ represents the number of carbons in the range of from 1 to 4, $R_2$ represents the number of carbons in the range of from 1 to 4, $R_3$ represents the number of carbons in the range of from 1 to 4, $R_4$ represents the number of carbons in the range of from 1 to 4.

The most preferred acetate compound for use as a component of the organic additive blend is butyl carbitol acetate (butoxy ethoxy ethyl acetate).

The unsaturated fatty amine compound component used in the preparation of the organic additive blend of the invention may be any suitable molecular compound that contributes to the enhanced properties of the final catalyst composition of the invention. Suitable unsaturated fatty amines are those that are miscible with the acetate compound used in the preparation of the organic additive blend.

The unsaturated fatty amine compound may be selected from among suitable unsaturated fatty amine compounds in the group of unsaturated fatty amines having 8 to 22 carbon atoms per molecule. The unsaturated fatty amine of the organic additive blend includes an amine moiety attached to a hydrocarbon chain of eight or more carbon atoms in length up to 22 carbon atoms with at least one carbon-carbon double bound within the hydrocarbon chain.

The most preferred unsaturated amine compound for use as a component of the organic additive blend is oleylamine ($C_{18}H_{35}NH_2$ with a double bound on the ninth ($9^{th}$) carbon).

The impregnation of the dried particle with the organic additive blend provides a composition that comprises the doped support particle overlaid with the metal overlayer of at least one hydrogenation metal and that further includes the organic additive blend. As mentioned above, the amount of organic additive blend impregnated into the dried particle provides a pore volume fill of the dried particle with the organic additive blend in the range of from 25% up to 100% of the available pore volume. The pore volume of the dried particle can be measured by any suitable method or means know to those skilled in the art. One suitable method is to measure the water pore volume of the dried particles by water titration or by filling the dried particles with water and measuring the weight difference between the dried particles and the water-filled particles to determine the volume of adsorbed water.

The final or organic additive blend impregnated composition may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. The composition can first undergo a hydrogen treatment that is then followed with treatment with a sulfur compound.

The hydrogen treatment includes exposing the composition to a gaseous atmosphere containing hydrogen at a temperature ranging upwardly to 250° C. Preferably, the impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The impregnated composition is contacted with the gaseous atmosphere at the temperature and pressure conditions mentioned above for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the composition after it has been treated with hydrogen can be done using any conventional method known to those skilled in the art. Thus, the hydrogen treated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated composition to their sulfided form. Typically, the sulfiding temperature at which the hydrogen treated composition is contacted with the sulfur compound is in the range of from 150° C. to 450° C., preferably, from 175° C. to 425° C., and, most preferably, from 200° C. to 400° C.

When using a hydrocarbon feedstock to sulfide the hydrogen treated composition, the sulfurization conditions can be the same as the process conditions under which the hydrotreating is performed. The sulfiding pressure at which the hydrogen treated composition is sulfided generally can be in the range of from 1 bar to 70 bar, preferably, from 1.5 bar to 55 bar, and, most preferably, from 2 bar to 35 bar.

It is recognized that the final or additive-impregnated composition of the invention, after its treatment with hydrogen and sulfur, is a highly effective catalyst for use in the hydrotreating of hydrocarbon feedstocks. This catalyst is particularly useful in applications involving the hydrodesulfurization (HDS) or hydrodenitrogenation (HDN), or both, of hydrocarbon feedstocks, and, especially, it has been found to be an excellent catalyst for use in the HDS and HDN of gas oil feedstocks.

The inventive composition may be used as well to make ultra-low sulfur distillate product having a sulfur concentration of less than 15 ppmw, preferably, less than 10 ppmw, and, most preferably, less than 8 ppmw. Also, as noted, the inventive composition may be used to treat heavier hydrocarbon feedstocks, such as the gas oils. In the hydrotreatment of gas oil, the nitrogen content of the treated product is typically less than 1000 ppmw, or less than 800 ppmw, and even less than 600 ppmw. The sulfur content of the treated product is typically less than 500 ppmw, or less than 400 ppmw, and, even less than 300 ppmw.

In hydrotreating applications, the composition, preferably is used in a delayed feed introduction procedure or otherwise treated with hydrogen and sulfur, as described above. In this procedure, the composition is contacted under suitable hydrodesulfurization conditions with a hydrocarbon feedstock that typically has a concentration of sulfur. This provides for sulfiding of the composition.

One hydrocarbon feedstock that may be processed using the inventive composition is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred distillate feedstock is a middle distillate boiling in the diesel boiling range of from about 140° C. to 400° C.

The gas oils may also be processed using the inventive composition. These gas oils may include atmospheric gas oil, light vacuum gas oil, and heavy vacuum gas oil. It is further contemplated that the inventive composition may have use in the treatment of residuum feedstocks, as well.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. However, the distillate feedstock typically has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydroprocessing process generally operates at a hydroprocessing reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydroprocessing reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

It is recognized that one of the unexpected features from the use of the inventive composition is that it exhibits higher catalytic activity than certain other alternative catalyst compositions, and, thus, it will, in general, provide for comparatively lower required process temperatures for a given amount of desulfurization or denitrogenation, or both.

The flow rate at which the hydrocarbon feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 $hr^{-1}$ to 5 $hr^{-1}$, more preferably, from 0.1 $hr^{-1}$ to 3 $hr^{-1}$. and, most preferably, from 0.2 $hr^{-1}$ to 2 $hr^{-1}$.

It is preferred to charge hydrogen along with the hydrocarbon feedstock to the reaction zone of the inventive process. In this instance, the hydrogen is sometimes referred to as hydrogen treat gas. The hydrogen treat gas rate is the amount of hydrogen relative to the amount of hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The hydrotreated product yielded from the process of the invention has low or reduced sulfur and nitrogen concentrations relative to the hydrocarbon feedstock.

The following examples are presented to further illustrate certain aspects of the invention, but they are not to be construed as limiting the scope of the invention.

EXAMPLE 1

Standard Inorganic Oxide Shaped Support

This Example 1 describes the preparation of the standard alumina support and its properties that was used in making the comparison compositions. Alumina and water were mixed to form an extrudable mixture that was shaped into 1.3 mm Trilobe extrudates. The shaped mixture was then dried and calcined using standard methods so as to provide an alumina support carrier for the loading of active metals and polar additive or hydrocarbon oil, or both, to provide comparison and inventive compositions. The following Table 1 presents certain of the physical properties of the shaped support.

TABLE 1

| Properties of Shaped Support | |
|---|---|
| PROPERTY | VALUE |
| Shape | 1.3 mm Trilobe |
| Surface Area ($m^2/g$) | 245 to 320 |
| Mean Pore Diameter (Ang.) | 80 to 100 |
| Pore Volume greater than 350 Å (%) | Less than 5 |
| Water Pore Volume (cc/g) | 0.74 to 0.90 |

EXAMPLE 2

Doped Inorganic Oxide Shaped Support

This Example 2 describes the preparation of the alumina support and its properties that was used in making the inventive compositions. Alumina, additive and water were mixed to form an extrudable mixture that was shaped into 1.3 mm Trilobe extrudates. The additives were chosen to be Boron or Nickel. Boric acid or Nickel nitrate we incorporated into the alumina by comulling in the quantities of 0.7-1.3% wt. boron or 1% wt nickel, respectively, relative to the calcined support. The shaped mixture was then dried and calcined using standard methods so as to provide an alumina support carrier for the loading of active metals and polar additives. The textural properties of the calcined supports were close to the ones provided in the Table 1 of the Example 1 above.

EXAMPLE 3

Comparative NiMo Catalyst Composition Using Pure Alumina

The metal components of the catalyst were incorporated into the standard carrier described in Example 1 by the incipient wetness impregnation technique. The impregnation solution included water, phosphoric acid ($H_3PO_4$), nickel carbonate ($NiCO_3$), and Climax molybdenum trioxide (62.5% Mo) to yield a composition on alumina of 16.5% wt. Mo, 4.5% wt. Ni and 3.0% wt. P. These weight percent values are based on the dry catalyst. The impregnated carrier or metal-incorporated support material was then dried at 125° C. (257° F.) for a period of a few hours to give a dried intermediate having an LOI of 6 to 9 wt % and a water pore volume of 0.32-0.34 cc/g. The pore volume was filled to 90% with propylene carbonate ($C_4H_6O_3$) yielding the final catalyst.

EXAMPLE 4

Comparative NiMo Catalyst Composition Using Alumina Doped with Boron

The alumina support containing Boron was prepared according to Example 2. Content of boron in the support was measured to be 0.77% wt. The support was impregnated with metals, dried and finished with propylene carbonate as described in Example 3.

EXAMPLE 5

Comparative NiMo Catalyst Composition Using Alumina Doped with Nickel

The alumina support containing Nickel was prepared according to Example 2. Content of Nickel in the support was measured to be 1.0% wt. The support was impregnated with metals, dried and finished with propylene carbonate as described in Example 3.

EXAMPLE 6

Comparative NiMo Composition Using Pure Alumina Support and OLA/BCA Finish

The pure alumina support was impregnated with metals as described in Example 3. A 50:50 volume blend of oleylamine $C_{18}H_{37}N$ (OLA) and butyl carbitol acetate $C_4H_9O$ $(CH_2CH_2O)_2C(O)CH_3$ (BCA) was impregnated onto the dried catalyst intermediate at 90% pore volume fill level to yield final catalyst.

EXAMPLE 7

Comparative NiMo Composition Using Pure Alumina Support and BCA Finish

The pure alumina support was impregnated with metals as described in Example 3. A pure butyl carbitol acetate $C_4H_9O$ $(CH_2CH_2O)_2C(O)CH_3$ (BCA) was impregnated onto the dried catalyst intermediate at 90% pore volume fill level to yield final catalyst.

EXAMPLE 8

Comparative NiMo Composition Using Doped Alumina Support and Pure BCA Finish The doped alumina support using 0.77% wt Boron per Example 2 was impregnated with metals as described in Example 3. A pure butyl carbitol acetate $C_4H_9O(CH_2CH_2O)_2C(O)CH_3$ (BCA) was impregnated onto the dried catalyst intermediate at 90% pore volume fill level to yield final catalyst.

EXAMPLE 9

Inventive NiMo Composition Using Doped Alumina Support and OLA/BCA Finish

The doped alumina support using 0.77% wt Boron per Example 2 was impregnated with metals as described in Example 3. A 50:50 volume blend of oleylamine $C_{18}H_{37}N$ (OLA) and butyl carbitol acetate $C_4H_9O(CH_2CH_2O)_2C(O)CH_3$ (BCA) was impregnated onto the dried intermediate at 90% pore volume fill to yield final product.

EXAMPLE 10

Comparative CoMo Catalyst Composition Using Pure Alumina

The metal components of the catalyst were incorporated into the standard carrier described in Example 1 by the incipient wetness impregnation technique. The impregnation solution included water, phosphoric acid ($H_3PO_4$), cobalt carbonate ($CoCO_3$), and Climax molybdenum trioxide (62.5% Mo) to yield a composition on alumina of 12.0% wt. Mo, 3.4% wt. Co and 2.1% wt. P dry catalyst basis. The impregnated carrier or metal-incorporated support material was then dried at 125° C. (257° F.) for a period of a few hours to give a dried intermediate having an LOI of 6 to 9 wt % and a water pore volume of 0.38-0.40 cc/g. The pore volume was filled to 90% with propylene carbonate ($C_4H_6O_3$) yielding the final catalyst.

EXAMPLE 11

Inventive CoMo Composition Using Doped Alumina Support and OLA/BCA Finish

The doped alumina support using 0.77% wt Boron per Example 2 was impregnated with metals as described in Example 10. A 50:50 volume blend of oleylamine $C_{18}H_{37}N$ (OLA) and butyl carbitol acetate $C_4H_9O(CH_2CH_2O)_2C(O)CH_3$ (BCA) was impregnated onto the dried intermediate at 90% pore volume fill to yield final product.

EXAMPLE 12

Catalyst Performance Testing Using Vacuum Gas Oil (VGO) Feeds

This Example 12 describes the general procedure used to test the catalytic performance of the additive impregnated compositions described in the Examples above, and it presents the performance results from their use in the hydrodesulfurization and hydrodenitrogenation of a typical vacuum gas oil. Each of the additive impregnated compositions was tested using reactors of a high throughput catalyst testing unit under the conditions presented in the following Table 2.

TABLE 2

| Reactor Test Conditions and Targets | |
|---|---|
| Hydrogen/Oil Ratio | 3500 scf/bbl |
| Pressure | 1400 psig |
| LHSV | 0.75 hr$^{-1}$ |
| Temperature | 700° F. |
| Target Nitrogen | 500 ppm |
| HDN Reaction Order | 1.0 |
| HDN Apparent Activation Energy | 26 kcal/mole |
| Target Sulfur | 500 ppm |
| HDS Reaction Order | 1.3 |
| HDS Apparent Activation Energy | 36 kcal/mole |

The feedstock used in the testing was a typical vacuum gas oil having the physical properties as presented in the following Table 3.

TABLE 3

| Test Feedstock Properties | |
|---|---|
| Hydrogen (wt %) | 10.91 |
| Carbon (wt %) | 84.75 |
| Nitrogen (wt %) | 0.314 |
| Sulfur (wt %) | 3.32 |
| Nickel (ppm) | 0.8 |
| Vanadium (ppm) | 1.6 |
| Basic Nitrogen (ppm) | 897 |
| API Gravity | 19.29 |
| UV Aromatics (Polynuclear) (%) | 17.0 |
| UV Aromatics (Total) (%) | 22.9 |
| MCR (wt %) | 1.1 |
| HTSD 50% (° F.) | 833 |
| HTSD 95% (° F.) | 1023 |
| Density (g/ml) | 0.9732 |

TABLE 4

| Catalyst Performance Results | | | |
|---|---|---|---|
| Example No. | Catalyst | Relative HDN Activity (° F.) | Relative HDS Activity (° F.) |
| | Reference Ni/Mo | 0 | 0 |
| 3 - comparison | Ni/Mo on standard non-doped support | −2 | 0 |
| 4 - comparison | Ni/Mo on boron-doped support | −3 | +1 |
| 5 - comparison | Ni/Mo on nickel-doped support | 0 | −3 |

TABLE 4-continued

Catalyst Performance Results

| Example No. | Catalyst | Relative HDN Activity (° F.) | Relative HDS Activity (° F.) |
|---|---|---|---|
| 6 - comparison | Ni/Mo on standard non-doped support with OLA/BCA finish | 0 | 0 |
| 7 - comparison | Ni/Mo on standard non-doped support with BCA finish | +2 | +1 |
| 8 - comparison | Ni/Mo on boron-doped support with BCA finish | −2 | 0 |
| 9 - invention | Ni/Mo on boron-doped support with OLA/BCA finish | −16 | −7 |
| 10 - comparison | Co/Mo on standard non-doped support | +13 | −1 |
| 11 - invention | Co/Mo on boron-doped support with OLA/BCA finish | −2 | −15 |

Table 4 presents a summary of the results from the performance testing of the inventive catalysts and the comparison catalysts described in the above examples. The activity for each catalyst is represented as an activity relative to that of a reference nickel/molybdenum catalyst, and it is presented as a difference in the reaction temperature required to achieve a specified level of either desulfurization or denitrogenation. For the inventive catalysts of Examples 9 and 11, they respectively exhibited 16° F. and 2° F. improvements in HDN activity and 7° F. and 15° F. improvements in HDS activity over the reference catalyst.

The comparison catalysts did not exhibit the level of improvement in their catalytic activities that the inventive catalysts demonstrated. The inventive catalyst comprised a doped support overlaid or impregnated with hydrogenation metals and finished with an organic additive blend of the invention. The comparison catalysts included: (1) catalysts that include a standard, non-doped support impregnated with hydrogenation metals (with no additive finish); (2) catalysts that include a doped support impregnated with hydrogenation metals (with no additive finish); (3) catalysts that include a standard, non-doped support impregnated with a hydrogenation metal and finished with an additive that is not in accordance with the invention; and (4) a catalyst including a doped support impregnated with a hydrogenation metal and finished with an additive that is not in accordance with the invention.

The comparative results show that the combination of the use of a doped support overlaid with hydrogenation metals and finished with a particular composition of an additive blend provides a catalyst having much enhanced and exceptionally high hydrotreating activities when compared to various alternative compositions.

That which is claimed is:

1. A method of making a hydroprocessing catalyst, the method comprises:
   providing a doped support particle, comprising a dopant and an inorganic oxide;
   impregnating the doped support particle with a metal impregnation solution, comprising at least one hydrogenation metal component, to provide a metal-impregnated doped support particle;
   drying the metal-impregnated doped support particle to provide a dried particle;
   impregnating the dried particle with an organic additive blend, comprising an acetate compound and an unsaturated fatty amine compound;
   wherein the dopant is selected from the group of compounds consisting of nickel compounds, cobalt compounds, chromium compounds, boron compounds, and combinations thereof;
   wherein the acetate compound is selected from the group consisting of alkyl acetates, ethoxy alkyl acetates, methoxy alkyl acetates, and alkoxy alkoxy alkyl acetates; and
   wherein the unsaturated fatty amine compound is selected from the group consisting of unsaturated fatty amine compounds containing from 8 to 22 carbon atoms per molecule.

2. The method as recited in claim 1, wherein the dopant is either nickel or boron and the doped support particle comprises from 0.01 wt. % to 5 wt. % of the dopant.

3. The method as recited in claim 2, wherein the organic additive blend has a weight ratio unsaturated fatty amine compound-to-acetate compound in the range from 30/70 to 90/10.

4. The method as recited in claim 3, wherein the acetate compound is butyl carbitol acetate and the unsaturated fatty amine compound is oleylamine.

5. The method as recited in claim 4, wherein the drying step provides the dried particle having an LOI in the range up to 25 wt. %.

6. The method as recited in claim 5, wherein the amount of the organic additive blend impregnated into the dried particle fills at least 75 vol. % of its available pore volume; and
   wherein the weight of the organic additive blend impregnated into the dried particle provides a weight ratio of the organic additive blend per dried particle in the range of from 1/8 to 1/2.

7. The method as recited in claim 6, wherein the impregnating of the doped support particle with an overlay of at least one hydrogenation metal includes molybdenum and either nickel or cobalt and provides an amount of nickel or cobalt in the hydroprocessing catalyst in the range of from 0.5 to 20 wt. %, and molybdenum in the range of from 5 to 50 wt. %, with the wt. % based on the metal as the element regardless of its actual form and the dry doped support particle, excluding the organic additive blend.

8. A hydroprocessing catalyst, comprising a doped support particle, comprising an inorganic oxide and from 0.01 to 5 wt. % nickel or boron or both; a metal overlayer of at least one hydrogenation metal component; and an impregnated organic additive blend, comprising an acetate compound and an unsaturated fatty amine; wherein the acetate compound is selected from the group consisting of alkyl acetates, ethoxy alkyl acetates, methoxy alkyl acetates and alkoxy alkoxy alkyl acetates; and wherein the unsaturated fatty amine compound is selected from the group consisting of unsaturated fatty amine compounds containing from 8 to 22 carbon atoms per molecule.

9. The hydroprocessing catalyst as recited in claim 8, wherein the at least one hydrogenation metal is selected from the group consisting of Group VIII metals of nickel and cobalt and Group VI metals of chromium, molybdenum, and tungsten.

10. The hydroprocessing catalyst as recited in claim 9, wherein the overlaid at least one hydrogenation metal includes molybdenum and either nickel or cobalt, wherein the nickel or cobalt is present in the hydroprocessing catalyst in an amount in the range of from 0.5 to 20 wt. % and the molybdenum is present in the hydroprocessing catalyst in the amount in the range of from 5 to 50 wt. %, with the wt. % based the metal as the element regardless of its actual form and the dry overlaid doped support particle, excluding the organic additive blend.

11. The hydroprocessing catalyst as recited in claim 10, wherein the organic additive blend has a weight ratio of unsaturated fatty amine compound-to-acetate compound in the range from 30/70 to 90/10.

12. The hydroprocessing catalyst as recited in claim 11, further comprises a weight ratio of the organic additive blend to the doped support particle overlaid with the metal overlayer, on a dry basis, in the range of from 1/8 to 1/2.

13. The hydroprocessing catalyst as recited in claim 12, wherein the acetate compound is butyl carbitol acetate and the unsaturated fatty amine compound is oleylamine.

14. A process, comprising: contacting under hydroprocessing conditions a hydrocarbon feedstock with the catalyst of claim 8.

15. The catalyst prepared by the method of claim 1.

* * * * *